United States Patent
Jensen

(10) Patent No.: US 9,394,658 B1
(45) Date of Patent: Jul. 19, 2016

(54) APPARATUS FOR RETRIEVING AND CONTAINING AN OBJECT

(71) Applicant: David Jensen, San Diego, CA (US)

(72) Inventor: David Jensen, San Diego, CA (US)

(73) Assignee: Naturewalk Pet Care, Inc., San Diego, CA (US)

( * ) Notice: Subject to any disclaimer, the term of this patent is extended or adjusted under 35 U.S.C. 154(b) by 0 days.

(21) Appl. No.: 14/885,795

(22) Filed: Oct. 16, 2015

(51) Int. Cl.
*A01K 29/00* (2006.01)
*E01H 1/12* (2006.01)
*A01K 1/01* (2006.01)
*B25J 1/04* (2006.01)

(52) U.S. Cl.
CPC .............. *E01H 1/1206* (2013.01); *A01K 1/01* (2013.01); *A01K 29/00* (2013.01); *B25J 1/04* (2013.01)

(58) Field of Classification Search
CPC .................... E01H 1/1206; E01H 2001/1226; E01H 1/006; A01K 1/01; A01K 29/00; B25J 1/04
USPC ..................................... 294/1.4, 1.3, 1.5, 214
See application file for complete search history.

(56) References Cited

U.S. PATENT DOCUMENTS

| | | | | |
|---|---|---|---|---|
| 3,777,708 A | * | 12/1973 | Vogt ...................... | A01K 23/005 294/1.5 |
| 4,995,661 A | * | 2/1991 | Aurness ................ | E01H 1/1206 294/1.4 |
| 6,196,600 B1 | | 3/2001 | Miller | |
| 9,187,871 B1 | * | 11/2015 | Contreras ............. | E01H 1/1206 |
| 2004/0135386 A1 | * | 7/2004 | Pineda .................. | E01H 1/1206 294/1.4 |
| 2007/0257163 A1 | * | 11/2007 | Register .............. | B65B 67/1238 248/99 |
| 2009/0050065 A1 | * | 2/2009 | Evans ................... | E01H 1/1206 119/161 |
| 2009/0200812 A1 | * | 8/2009 | Mambru ............... | E01H 1/1206 294/1.4 |
| 2012/0256430 A1 | * | 10/2012 | Merino-Garcia ..... | E01H 1/1206 294/1.3 |

FOREIGN PATENT DOCUMENTS

CA        2334371 A1 * 12/2001    ............ E01H 1/1206

\* cited by examiner

*Primary Examiner* — Gabriela Puig

(57) ABSTRACT

An apparatus including a main housing and a cartridge enclosure including a first connector to removably couple the cartridge enclosure to a cartridge including a container having an opening across a plane, at least one drawstring disposed around the opening to close the opening upon the at least one drawstring being pulled, and a rigid support disposed around the plane of the opening to maintain the opening across the plane as the opening is being closed. The apparatus further includes an arm including a second connector to removably couple the arm to the at least one drawstring. A first spring between the arm and the cartridge is disposed to allow the arm to move away from the cartridge a predetermined distance which pulls the at least one drawstring to close the opening.

20 Claims, 5 Drawing Sheets

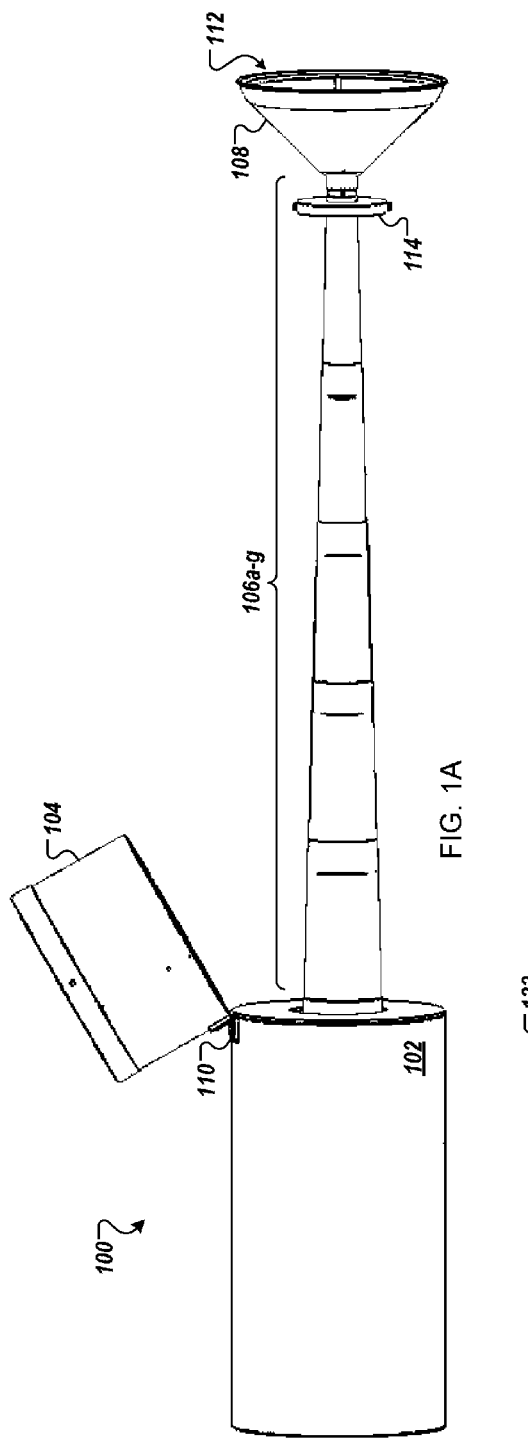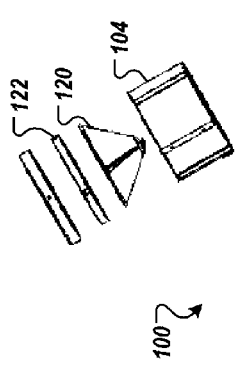

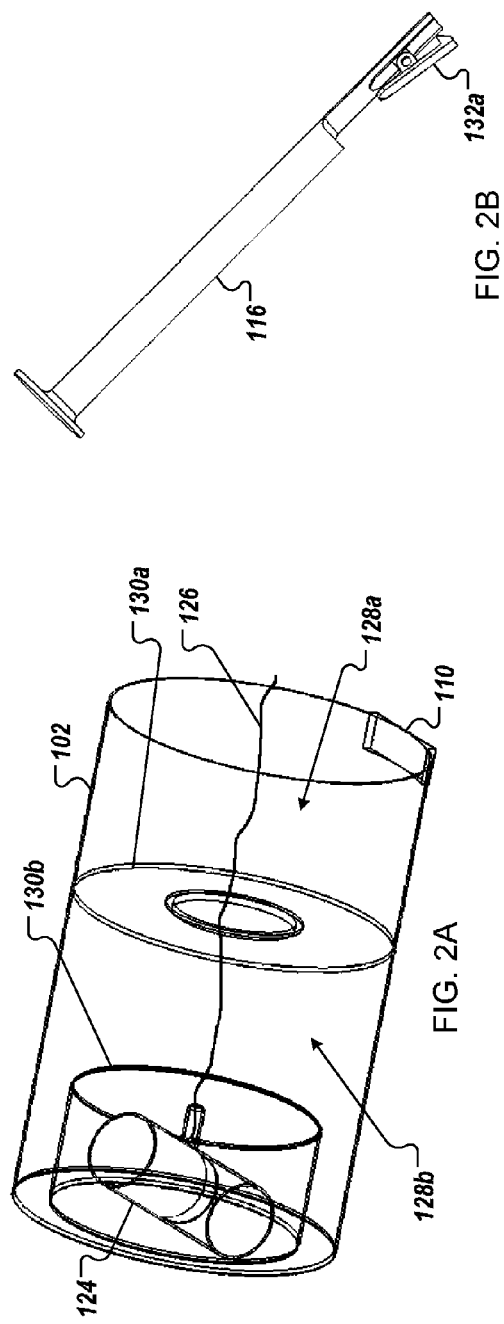
FIG. 2A
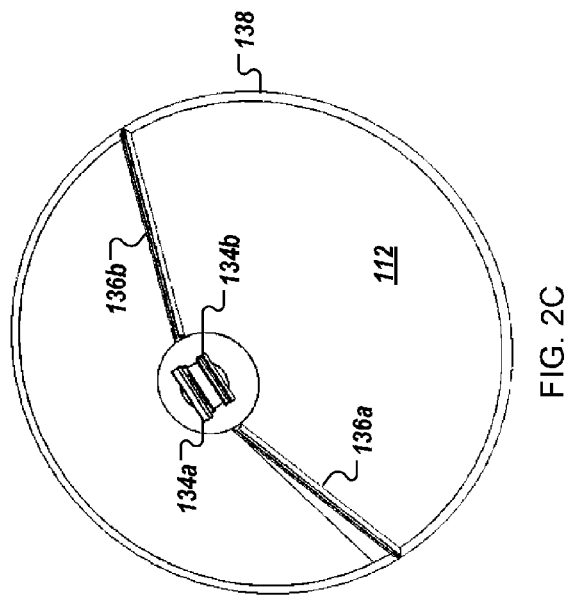
FIG. 2B
FIG. 2C

APPARATUS FOR RETRIEVING AND CONTAINING AN OBJECT

TECHNICAL FIELD

This instant specification relates to an apparatus for retrieving and containing an object, such as animal feces.

BACKGROUND

Many ways exist to pick up animal feces. A poop scoop is a device used to pick up animal feces, such as dog feces. The feces may be pushed into a scoop, like pushing dust into a dustpan. Alternatively, two opposing scoops may be closed around animal feces to pick the feces up. In some cases, a person may use a bag, which is typically turned inside out over the person's hand, like a glove. The person may then pick up the feces using the bag over the hand and then invert the bag around the feces to contain the feces.

DESCRIPTION OF DRAWINGS

FIGS. 1A-D show views of an example of an apparatus for retrieving and containing an object, such as dog feces.

FIGS. 2A-C show cut away views of portions of an example of an apparatus for retrieving and containing an object, such as dog feces.

DETAILED DESCRIPTION

Figure 1C:
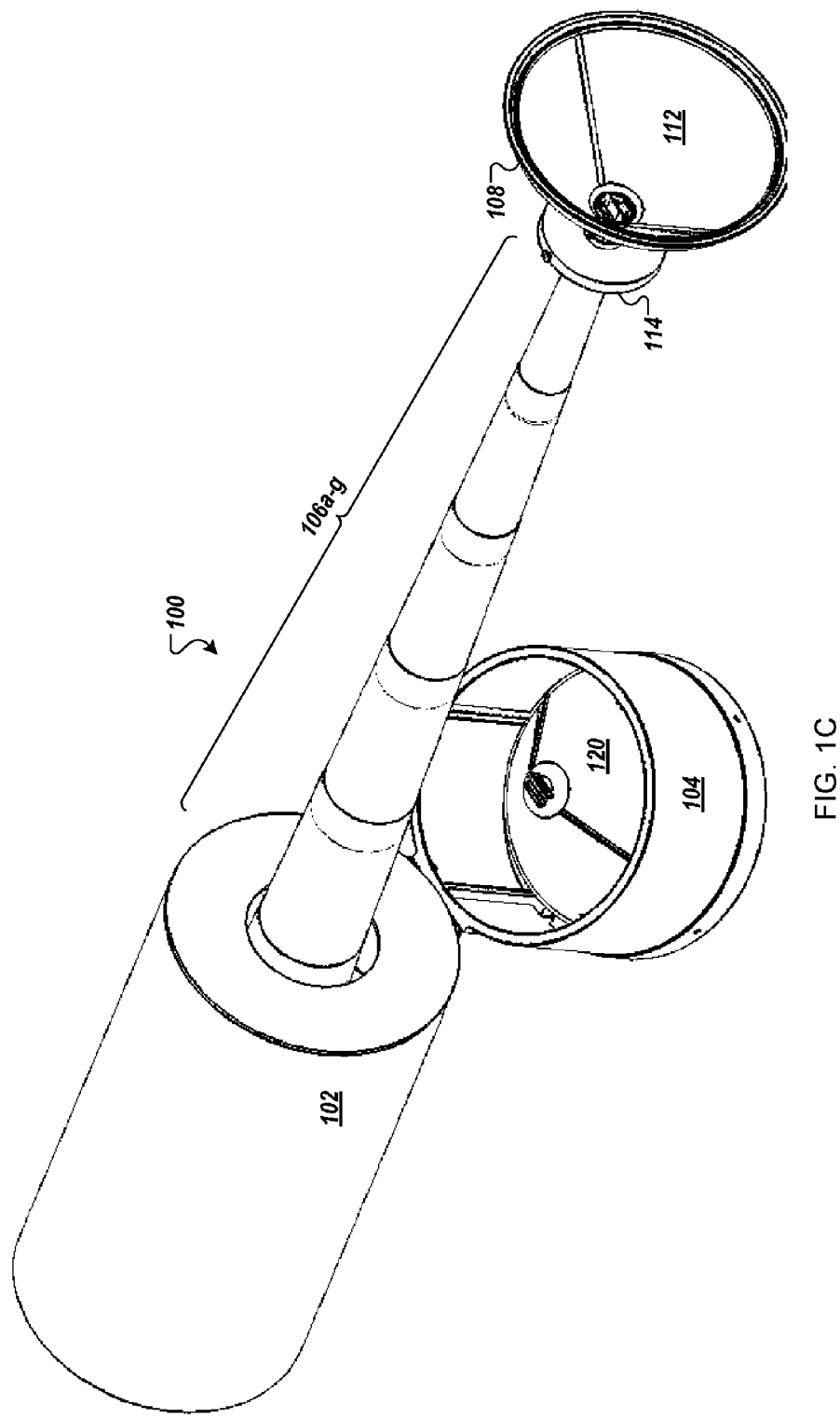

This document describes examples of an apparatus for retrieving and containing an object, such as dog feces. The apparatus may also retrieve and contain feces from other animals, such as a cat. The apparatus may also retrieve and contain other objects, such as rigid or semi rigid objects which may be picked up from the ground and with which a person may not wish to come in direct contact, such as a small dead animal or a specimen to be isolated for research. In some implementations, the apparatus may retrieve and contain objects in a liquid, such as an object floating or suspended in water.

FIG. 1A shows a side view of an example of an apparatus 100 for retrieving and containing an object, such as dog feces. The apparatus 100 includes a main housing 102, a cover 104 or lid, multiple telescoping arm sections 106a-g, and a cartridge enclosure 108. The cover 104 is connected to the main housing 102 by a hinge 110. A person may close the cover 104 over the telescoping arm sections 106a-g and the cartridge enclosure 108 when the telescoping arm sections 106a-g and the cartridge enclosure 108 are retracted into or up to the main housing 102.

While the telescoping arm sections 106a-g are extended and a person holds the apparatus 100 by the main housing 102, the apparatus 100 may be sized for an average person's or any desired height so that the cartridge enclosure 108 reaches the ground. This allows the apparatus 100 to be able to pick up an object from the ground, such as dog feces. In some implementations, when the person releases the telescoping arm sections 106a-g from the main housing 102, and with gravity, the telescoping arm sections 106a-g and the cartridge enclosure 108 may be extended toward the ground. Alternatively, in the case of retrieving an object from a body of water, such as a pool, the telescoping arm sections 106a-g may be sized to reach into the body of water an appropriate distance. For example, the telescoping arm sections 106a-g may be sized so as to cover as much of a typically sized pool as possible without being so long that the apparatus 100 cannot be supported by an average person.

The cartridge enclosure 108 holds or comprises a cartridge 112. As will be described below, a person may control the apparatus 100 to retrieve and contain or enclose an object, such as dog feces, within the cartridge 112. The person may then activate an actuator assembly 114 to disengage the cartridge 112 from the cartridge enclosure 108 and eject or discharge the cartridge 112 from the apparatus 100. In some implementations, the cartridge 112 may be disposed of along with the object contained or enclosed within the cartridge 112.

FIG. 1B shows an exploded view of the apparatus 100. The exploded view shows the main housing 102, the cover 104, the telescoping arm sections 106a-g, the cartridge enclosure 108, the cartridge 112, and the actuator assembly 114. The exploded view also shows a plunger 116 and a plunger enclosure 118. The plunger enclosure 118 is coupled to the cartridge enclosure 108. The plunger 116 passes through the plunger enclosure 118 and the cartridge enclosure 108 to connect the apparatus 100 to the cartridge 112.

The cover 104 may be used to store one or more additional cartridges 120. While the cover 104 is closed, a person may manually load one of the additional cartridges 120 into the cartridge enclosure 108 by pressing at the back of the cover 104 so that the additional cartridge engages connectors on the plunger 116. Alternatively, the apparatus 100 may automatically load one of the additional cartridges 120 into the cartridge enclosure 108.

FIG. 1C shows perspective view from above the apparatus 100. The perspective view from above shows the main housing 102, the cover 104, the telescoping arm sections 106a-g, the cartridge enclosure 108, the cartridge 112, the actuator assembly 114, and the additional cartridges 120. A person may activate the actuator assembly 114 to release the cartridge 112 from the cartridge enclosure 108. The person may then retract the telescoping arm sections 106a-g into or up to the main housing 102 and close the cover 104 over the cartridge enclosure 108, which is now empty.

Figure 1D:
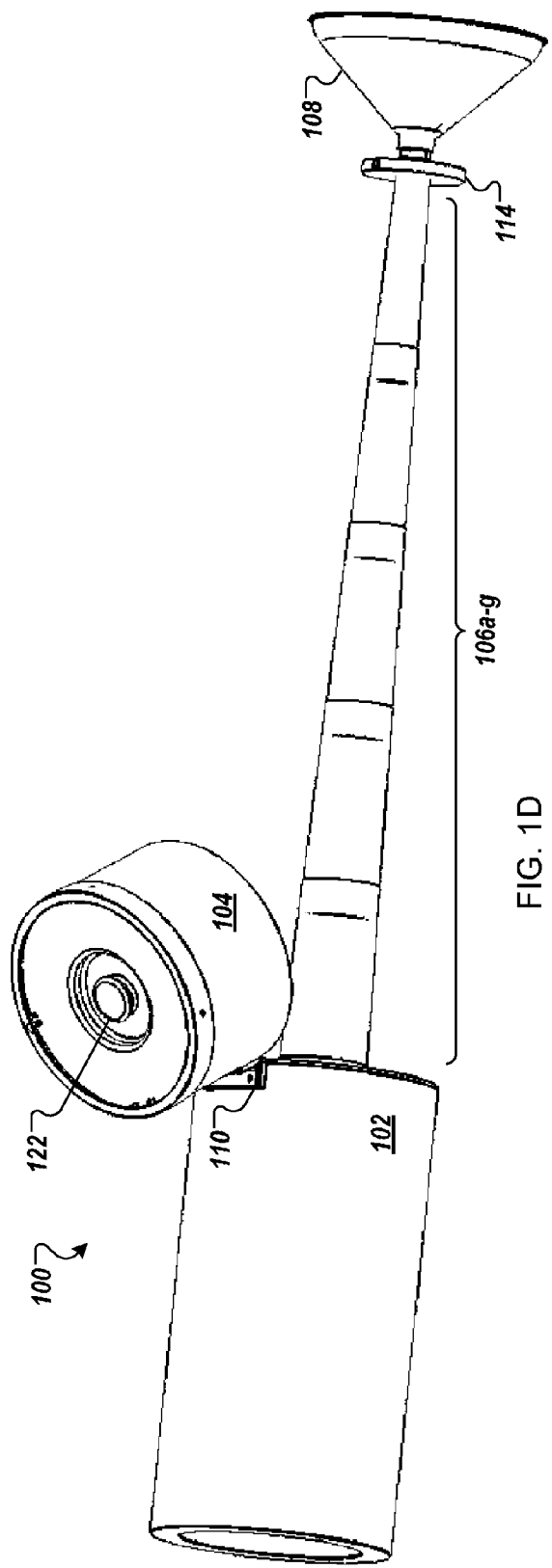

FIG. 1D shows a perspective view from below the apparatus 100. The perspective view from below shows the main housing 102, the cover 104, the telescoping arm sections 106a-g, the cartridge enclosure 108, and the actuator assembly 114. The cover 104 includes a loading plate and handle 122. The loading plate and handle 122 are allowed to move within the cover 104 so that a person may press on the loading plate and handle 122 to manually load one of the additional cartridges 120 into the cartridge enclosure 108.

Alternatively, the apparatus 100 may automatically load one of the additional cartridges 120 into the cartridge enclosure 108. For example, the cartridge enclosure 108 may include a sensor, such as a proximity sensor, that senses when a cartridge is in the cartridge enclosure 108. In addition, the cover 104 may include a sensor, such as a proximity sensor, that senses when the additional cartridges 120 are in the cover 104. The cover 104 and/or the main housing 102 may also include a light, such as a light emitting diode (LED), that lights up when the cover 104 is empty to indicate that the operator should load additional cartridges into the cover 104. The main housing 102 and/or the cover 104 may further have a sensor, such as a contact sensor, that senses when the cover 104 is closed or in contact with the main housing 102. The main housing 102 and/or the cover 104 may include a microcontroller that activates a motor, such as a stepper motor, in the cover 104 to load one of the additional cartridges 120 into the cartridge enclosure 108 when the microcontroller determines that there is no cartridge in the cartridge enclosure 108, that the additional cartridges 120 are in the cover 104, and that the cover 104 is closed over the end of the main housing 102.

FIG. 2A shows a cut away view of the main housing 102 of the apparatus 100. The main housing 102 includes a handle 124 and a retractor cable 126 that is coupled at one end to a motor within the main housing 102 and to the plunger 116 at the other end (not shown). A person may hold onto the apparatus 100 by the handle 124. The handle 124, or another location on the apparatus 100, may include controls for activating a motor that is within the main housing 102. The motor winds up the retractor cable 126 to retract the telescoping arm sections 106a-g and/or the cartridge enclosure 108 into a first space 128a and/or a second space 128b within or up to the main housing 102. For example, the cartridge enclosure 108 may retract into the first space 128a and the telescoping arm sections 106a-g may retract into the second space 128b. In some implementations, the motor may be located within the handle 124. Alternatively, the motor may be located elsewhere within the main housing 102, such as in the second space 128b into which the telescoping arm sections 106a-g retract.

The first telescoping arm section 106a may be fixedly attached or coupled to the main housing 102. The other telescoping arm sections 106b-g may be allowed to slide through one another up to some fully extended position at which point each telescoping arm section can no longer extend further away from the telescoping arm section immediately before it. For example, the first telescoping arm section 106a may be fixedly attached or coupled to one or more plates 130a-b within the main housing 102, such as at either end of the second space 128b into which the other telescoping arm sections 106b-g retract.

In some implementations, the handle 124, or another location on the apparatus 100, may include controls for releasing the cover 104 and/or the telescoping arm sections 106a-g from the main housing 102. For example, the hinge 110 on the cover 104 may have a spring and a person may activate a control on the handle 124 to release a catch on the cover 104 that allows the cover 104 to spring open. In another example, a person may activate a control on the handle 124 to release a catch on the telescoping arm sections 106a-g that allows the telescoping arm sections 106a-g to extend away from the main housing 102 and for the retractor cable 126 to unspool or unwind. The controls may be mechanical, such as a lever or other mechanical connection between the controls and the catches for the cover 104 and/or the telescoping arm sections 106a-g. Alternatively, the controls may be electrical, such as an electrical push button that activates a motor, solenoid, or other electrical device to release the catches for the cover 104 and/or the telescoping arm sections 106a-g.

FIG. 2B shows a side view of the plunger 116. The plunger 116 includes a connector 132a that removably attaches or couples the plunger 116 to the cartridge 112. The cartridge enclosure 108 also includes a connector 132b that removably attaches or couples the cartridge enclosure 108 to the cartridge 112. The connectors 132a-b may be spring clips and/or grab catches that allow the cartridge 112 to be pressed into the clip or grab catch. The clip or catch then clips onto or grabs one or more catches on the cartridge 112. In some implementations, the cartridge 112, the cover 104, and/or the cartridge enclosure 108 have guides that align the connectors 132a-b with the catches on the cartridge 112.

The plunger 116 may be fixedly attached or coupled to the last telescoping arm section 106g. Alternatively, the plunger 116 may be the last telescoping arm section 106g. The apparatus 100 allows the plunger 116 to slide within the plunger enclosure 118. The plunger 116 and the plunger enclosure 118 are coupled to one another by a spring that keeps the plunger 116 within the plunger enclosure 118 when the plunger is not being pulled away from the plunger enclosure 118. In some implementations, the plunger 116 and/or the plunger enclosure 118 include stops that prevent the plunger 116 from sliding into or out the plunger enclosure 118 past predetermined limits. The plunger enclosure 118 is fixedly attached or coupled to the cartridge enclosure 108.

FIG. 2C shows a top view of the cartridge 112. The cartridge 112 includes one or more catches 134a-b onto which the connectors 132a-b of the plunger 116 and the cartridge enclosure 108 removably attach or couple. For example, the second catch 134b of the cartridge 112 may removably couple to the connector 132b of the cartridge enclosure 108 to hold the cartridge 112 within the cartridge enclosure 108. The first catch 134a of the cartridge 112 may removably couple to the connector 132a of the plunger 116.

The cartridge 112 also includes one or more channel structures 136a-b through which one or more drawstrings pass. The drawstrings are connected to the first catch 134a. The drawstrings pass from the first catch 134a, through the channel structures 136a-b to a lower edge 138 of the cartridge 112 where the drawstrings are disposed around the opening of the cartridge 112 and through a flexible material, such as flexible or elastic fabric or plastic.

When a person pulls the handle 124 of the main housing 102 while the telescoping arm sections 106a-g are fully extended and while preventing the cartridge enclosure 108 from leaving the ground, such as by stepping on the edge of the cartridge enclosure 108, the plunger 116 is pulled away from the plunger enclosure 118 and the cartridge enclosure 108. Alternatively, the telescoping arm sections 106a-g may lock into place or the apparatus 100 may have a rigid arm rather than a telescoping arm so that the cartridge enclosure 108 may be held over or around the object without stepping on the cartridge enclosure 108.

Accordingly, the connector 132a on the plunger 116 pulls the first catch 134a on the cartridge 112, which pulls the drawstrings. Pulling the drawstrings results in cinching the flexible material closed across the plane of the lower opening of the cartridge 112. As the flexible material is cinched closed and the cartridge enclosure 108 is prevented from leaving the ground (e.g., by stepping on the edge of the cartridge enclosure 108), the flexible material passes under the object to be retrieved and is contained within the cartridge 112 by the flexible material.

In one implementation, one edge of the flexible material is coupled around the opening of the cartridge 112. The opening of the cartridge 112 then forms a rigid support that is placed around the object to be retrieved and contained by the apparatus 100. The rigid support maintains the flexible material across the plane of the opening of the cartridge 112 as the drawstrings close the flexible material over the opening. The cartridge 112 and the flexible material together form a container for the object and the cartridge 112 forms a housing for the container.

In another implementation, the flexible material forms a bag within the cartridge 112. The bag forms the container for the object and the cartridge 112 forms the housing for the container. The cartridge 112 may then have a ring within the bag. The ring may be disposed around the inside of the opening of the cartridge 112. The ring may form the rigid support that is placed around the object to be retrieved and contained within the apparatus 100. The rigid support maintains the bag across the plane of the opening of the cartridge 112 as the drawstrings close the opening of the bag. The drawstring may hold the bag and/or the ring in place within the cartridge 112. The bag may hold the ring in place by being partially wrapped or closed over the ring. As the drawstring is pulled, the bag may pass over the ring to cinch the opening of the bag closed across the plane of the opening of the cartridge 112.

In some implementations, the channel structures 136a-b and/or the drawstrings have structures that prevent the flexible material from opening once it has been closed. For example, the drawstrings may have bulbs along them that are funneled into the channel structures, but then catch on non-funneled exit openings of the channel structures 136a-b to prevent the drawstrings from sliding back past the bulbs once the bulbs have gone past the exit opening. In another example, the drawstrings may have barbs along them that are funneled into the channel structures, but then catch on non-funneled exit openings of the channel structures 136a-b to prevent the drawstrings from sliding back past the barbs once the barbs have gone past the exit opening. In yet another example, the channel structures 136a-b may have barb-like structures that allow the drawstrings to move in the direction that closes the flexible material but not in the direction that would allow the flexible material to open again.

In some implementations, the cartridge enclosure 108 may include a motor to pull the drawstrings. The handle 124, or another location on the apparatus 100, may include controls for activating the motor that pulls the drawstring. The motor operated drawstring may obviate the plunger 116, the plunger enclosure 118, and the spring connection between the plunger 116 and the plunger enclosure 118.

Figure 3C:
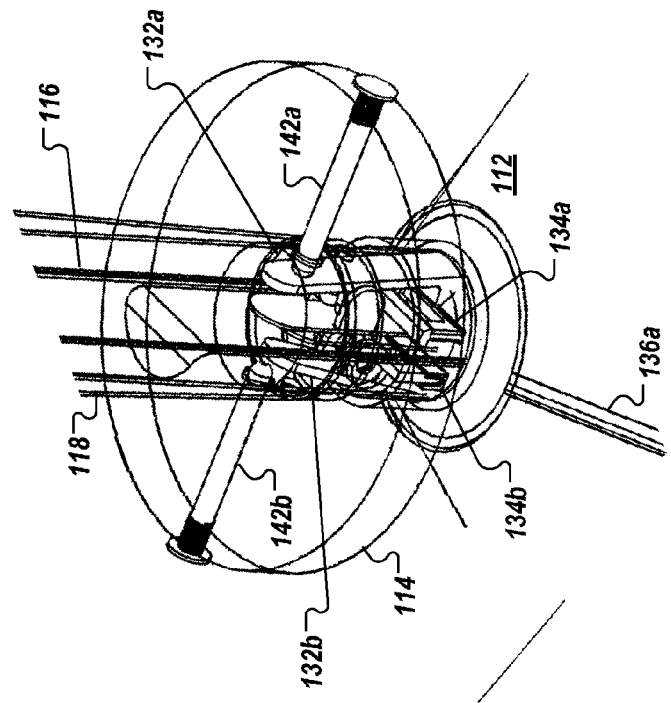
FIGS. 3A-C show cut away views of an example of connectors and actuators of an apparatus for retrieving and containing an object, such as dog feces.
Figure 3B:
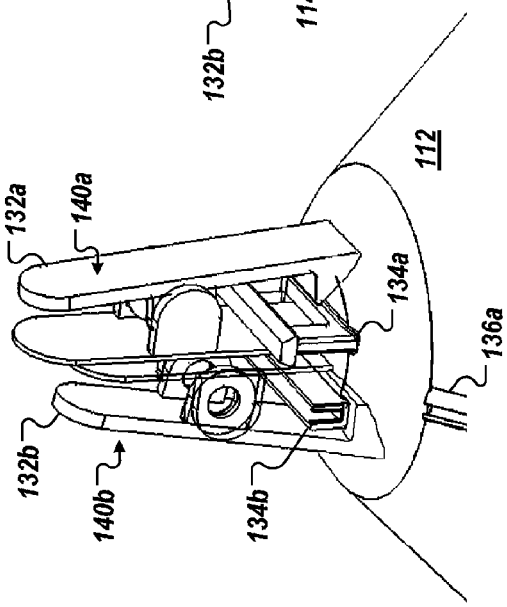
Figure 3A:
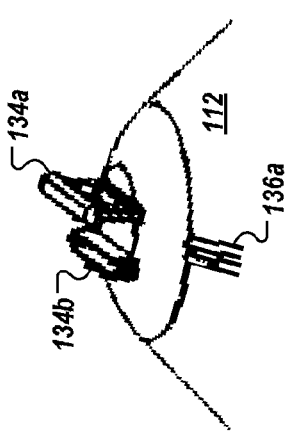

FIG. 3A shows a cut away view of the cartridge 112 of the apparatus 100. The cut away view of the cartridge 112 shows the catches 134a-b at the top of the cartridge 112. The cut away view also shows the channel structure 136a.

FIG. 3B shows a cut away view of the cartridge 112 and the connectors 132a-b of the apparatus 100. The connectors 132a-b are engaged on the catches 134a-b, respectively. In one example, one or more of the connectors 132a-b may be spring activated, so that the resting state of the connectors 132a-b is in the clipped or grabbing position. An actuator may then press on one or more lever portions 140a-b of the connectors 132a-b, respectively, to change the connectors 132a-b to the unclipped or not grabbing state.

FIG. 3C shows a cut away view of the cartridge 112, the connectors 132a-b, the actuator assembly 114, the plunger 116 and the plunger enclosure 118 of the apparatus 100. The cut away view shows the connector 132a coupled to the plunger 116. The cut away view also shows the connector 132b coupled to the cartridge enclosure 108 and/or the plunger enclosure 118. The actuator assembly 114 includes one or more actuators 142a-b that can be pressed in toward the lever portions 140a-b of the connectors 132a-b to release the connectors 132a-b from the catches 134a-b, respectively. The position of the actuators 142a-b when the telescoping arm sections 106a-g are retracted into or up to the main housing 102 may correspond to elements within the main housing 102 that press the actuators 142a-b in the lever portions 140a-b. In one implementation, the elements automatically press the actuators 142a-b when the telescoping arm sections 106a-g are retracted into or up to the main housing. In another example, the handle 124, or another location on the apparatus 100, may have a control for activating the actuators 142a-b. In some implementations, the cartridge 112 containing the object may be stored in the apparatus 100 (e.g., with the cover 104 closed), for example, until a suitable receptacle, such as a garbage bin, can be found.

What is claimed is:

1. An apparatus comprising:
   a main housing;
   a cartridge enclosure comprising a first connector to removably couple the cartridge enclosure to a cartridge comprising:
     a container having an opening across a plane,
     at least one drawstring disposed around the opening to close the opening upon the at least one drawstring being pulled,
     a rigid support disposed around the plane of the opening to maintain the opening across the plane as the opening is being closed, and
     a container housing to support the container and the rigid support, wherein the first connector is to removably couple the cartridge enclosure to the container housing;
   an arm fixedly coupled to the main housing and movably coupled to the cartridge enclosure by a first spring, wherein the arm comprises a second connector to removably couple the arm to the at least one drawstring, and wherein the first spring between the arm and the cartridge enclosure is disposed to allow the arm to move away from the cartridge a predetermined distance which pulls the at least one drawstring to close the opening; and
   a first actuator coupled to the first connector and the second connector to disengage the first connector from the container housing and the second connector from the at least one drawstring to release the cartridge from the cartridge enclosure and the arm.

2. The apparatus of claim 1, wherein the container and the opening are sized to accommodate dog feces.

3. The apparatus of claim 1, wherein the cartridge enclosure comprises guides to align the container housing with the first connector and the at least one drawstring with the second connector.

4. The apparatus of claim 1, wherein the arm is to telescope out of and back into the main housing.

5. The apparatus of claim 4, wherein the main housing comprises a second motor and a second actuator to activate the second motor to retract the arm back into the main housing.

6. The apparatus of claim 4, wherein the main housing comprises a third actuator to release the arm and allow gravity to telescope the arm out of the main housing.

7. The apparatus of claim 6, wherein the main housing comprises a lid to cover the arm and the cartridge enclosure while the arm is retracted into the main housing, and wherein the main housing comprises a catch to keep the lid closed over the arm and the cartridge enclosure.

8. The apparatus of claim 7, wherein the main housing comprises a second spring to open the lid, and wherein the third actuator is also to release the catch to allow the second spring to open the lid.

9. The apparatus of claim 7, wherein the lid stores a plurality of cartridges comprising the cartridge, and wherein the lid comprises guides to allow the cartridge to be loaded from the lid into the cartridge enclosure while the lid is closed over the arm and the cartridge enclosure.

10. An apparatus comprising:
    a main housing;
    a cartridge enclosure comprising a first connector to removably couple the cartridge enclosure to a cartridge comprising:
      a container having an opening across a plane,
      at least one drawstring disposed around the opening to close the opening upon the at least one drawstring being pulled, a rigid support disposed around the plane of the opening to maintain the opening across the plane as the opening is being closed, a container housing to support the container and the rigid support, wherein the first connector is to removably couple the cartridge enclosure to the container housing, and an arm coupled to the main housing, the cartridge enclosure, and a first motor, wherein the arm comprises a second connector to removably couple the first motor to the drawstring;

a first actuator coupled to the first connector and the second connector to disengage the first connector from the container housing and the second connector from the drawstring to release the cartridge from the cartridge enclosure and the arm; and a fourth actuator coupled to the first motor to activate the first motor to pull the at least one drawstring to close the opening.

11. The apparatus of claim 10, wherein the container and the opening are sized to accommodate dog feces.

12. The apparatus of claim 10, wherein the cartridge enclosure comprises guides to align the container housing with the first connector and the drawstring with the second connector.

13. The apparatus of claim 10, wherein the arm is to telescope out of and back into the main housing.

14. The apparatus of claim 13, wherein the main housing comprises a second motor and a second actuator to activate the second motor to retract the arm back into the main housing.

15. The apparatus of claim 14, wherein the main housing comprises a third actuator to release the arm and allow gravity to telescope the arm out of the main housing.

16. The apparatus of claim 15, wherein the main housing comprises a lid to cover the arm and the cartridge enclosure while the arm is retracted into the main housing, and wherein the main housing comprises a catch to keep the lid closed over the arm and the cartridge enclosure.

17. The apparatus of claim 16, wherein the main housing comprises a second spring to open the lid, and wherein the third actuator is also to release the catch to allow the second spring to open the lid.

18. The apparatus of claim 16, wherein the lid stores a plurality of cartridges comprising the cartridge, and wherein the lid comprises guides to allow the cartridge to be loaded from the lid into the cartridge enclosure while the lid is closed over the arm and the cartridge enclosure.

19. An apparatus comprising:

a container having an opening across a plane, wherein the container and the opening are sized to accommodate dog feces;

at least one drawstring disposed around the opening to close the opening upon the at least one drawstring being pulled;

a rigid support disposed around the plane of the opening to maintain the opening across the plane as the opening is being closed; and a container housing to support the container and the rigid support.

20. The apparatus of claim 19, wherein the container housing comprises at least one channel structure through which the at least one drawstring is disposed, and wherein the at least one channel structure and the at least one drawstring prevent the opening from reopening when the opening is closed.

* * * * *